US005164000A

United States Patent [19]

Gamblin

[11] Patent Number: 5,164,000

[45] Date of Patent: Nov. 17, 1992

[54] LITHOGRAPHIC PRINTING FOUNTAIN SOLUTION

[76] Inventor: Rodger L. Gamblin, 8 Springhouse Rd., Dayton, Ohio 45409

[21] Appl. No.: 721,998

[22] Filed: Jun. 27, 1991

[51] Int. Cl.[5] .................... C09K 3/18

[52] U.S. Cl. .................... 106/2; 101/451

[58] Field of Search .................... 106/2; 101/451

[56] References Cited

U.S. PATENT DOCUMENTS

| | | | |
|---|---|---|---|
| 3,625,715 | 12/1971 | Nasca | 106/2 |
| 3,877,372 | 4/1975 | Leeds | 106/2 |
| 4,053,319 | 10/1977 | Nadeau et al. | 106/2 |
| 4,247,328 | 1/1981 | Lawson et al. | 106/2 |
| 4,278,467 | 7/1981 | Fadner | 106/2 |
| 4,548,645 | 10/1985 | Thiebaut | 106/2 |
| 4,560,410 | 12/1985 | Burns et al. | 106/2 |
| 4,641,579 | 2/1987 | Bernstein | 106/2 |
| 4,854,969 | 8/1989 | Bassemir et al. | 106/2 |
| 4,865,646 | 9/1989 | Egberg | 106/2 |
| 4,938,800 | 7/1990 | Allen | 106/2 |

*Primary Examiner*—Mark L. Bell
*Assistant Examiner*—Helene Klemanski
*Attorney, Agent, or Firm*—Wood, Herron & Evans

[57] ABSTRACT

An additive for lithographic printing fountain solutions to replace isopropyl or ethyl alcohols is defined that comprises a volatile material that lowers the surface tension of the fountain solution. The volatility of the material with respect to water causes an aggressive spreading that is associated with performance similar to the alcohols currently in use.

15 Claims, No Drawings

LITHOGRAPHIC PRINTING FOUNTAIN SOLUTION

FIELD OF THE INVENTION

This invention relates to lithographic printing and more particularly to an improvement in the fountain solutions used with such printing.

BACKGROUND OF THE INVENTION

Lithographic printing uses a planographic printing plate, that is, a plate in which the printing and non-printing areas are in the same plane rather than being vertically displaced from each other. The printing areas are distinguished from the non-printing areas by being hydrophobic, whereas the printing areas are hydrophilic. In operation, a lithographic printing plate is covered with a thin film of a so-called "fountain solution" (sometimes also called etch, water, or dampener) which enables the printing plate to be properly inked. The fountain solution is mostly or even entirely water and adheres to the hydrophilic areas of the plate. When the plate is thereafter subjected to inking by means of an oily, ink-covered inking roller, those areas of the plate that are hydrophobic pick up ink and can be used for printing whereas those areas that are hydrophilic refuse ink and do not print.

With commercial lithographic presses that make many impressions it has been found that various additives to the fountain solution increase the quality of printing and the number of impressions that can be made with a given set of printing plates. Common fountain solution additives include gum arabic and various other water soluble polar polymers that act to maintain a uniform film of water over the hydrophilic areas of the printing plate. Other additives control Ph, lower surface tension, prevent foaming, prevent bacterial or fungal growth, prevent corrosion, or maintain a hydrophilic oxide in the non-printing areas. Much art exists in the details of fountain solution composition for the various printing tasks, and many specialists exist in the field.

It is known that the addition of ethyl or isopropyl alcohol to a given fountain solution in the amount of about 10 to 50% by volume (of the amount of water) increases the quality of printing. The improvement obtains over almost all types of lithographic printing (small office units, intermediate sized sheet fed units, and massive publication devices). To my knowledge the reason for the effectiveness of such alcohols has never been fully understood. It is known that one effect of alcohol, namely the lowering of surface tension, is important; however, the use of various surfactants that lower surface tension to the same levels as ethyl or isopropyl alcohol do, are, for some reason, not as effective as the alcohols themselves.

Though practice is far from uniform over the printing industry, fountain solution additives other than alcohol are usually sold as concentrates and are called etch or fountain solution concentrates. The fountain solution is made by diluting the etch concentrate with water. The alcohols or their substitutes are usually added after the fountain solution is made and are called additives. I shall follow these conventions in the material presented below. In particular I use the terms "fountain solution" and "etch" to mean that entity which is achieved by diluting an etch or fountain solution concentrate with water. "Fountain solution concentrate" is used to mean concentrates for fountain solutions which contain gum, buffers, oxidants, surfactants, biocides and so forth, but not containing alcohol or alcohol substitutes.

The use of isopropyl and ethyl alcohol is widespread in the printing industry, and such use causes some definite problems. Though isopropyl and ethyl alcohols are inexpensive, the massive amounts used in a high volume printing plant add considerably to the cost of printing. Both isopropyl and ethyl alcohol are flammable and both are toxic and irritating. Moreover, their use represents a heavy environmental load. As a result many printers have either prohibited their use or are attempting to at least cut back on the amount used. At the present time many printers maintain that the curtailment of alcohol causes a decrease in quality and greater difficulty associated with the running of a printing plant.

THE PRIOR ART

Because printing is such a major manufacturing area, because of the importance of printing quality, and because of the above difficulties associated with the use of alcohol, many attempts have been made either to eliminate or restrict the use of alcohol with lithographic printing.

Egberg U.S. Pat. No. 4,865,646 teaches acetylene derived surfactants for use as fountain solution additives. Bassimer et al U.S. Pat. No. 4,854,969 uses a combination of essentially non-volatile surfactants with relatively low hydrophilic-hydrophobic balance along with hydrotropes. Bernstein U.S. Pat. No. 4,641,579 uses a thickening agent to mime some of the thickening seen when isopropyl is mixed with water. Burns et al U.S. Pat. No. 4,560,410 teaches a mix of glycol ethers and polyols.

Thiebaut U.S. Pat. No. 4,548,645 uses a poly carboxylic acid with organic bases. Fadner U.S. Pat. No. 4,278,467 uses oil soluble, non-volatile, glycol ethers. Leeds U.S. Pat. No. 3,877,372 uses a silicone glycol copolymer surfactant, a glycol ether and a glycol. Nasca U.S. Pat. No. 3,625,715 uses moderately high molecular weight polyethylene oxide as an alcohol replacement. Allen U.S. Pat. No. 4,938,800 uses ethylene diamine to reduce the amount of emission of fumes of alcohols from fountain solutions.

Lawson et al U.S. Pat. No. 4,247,328 claims a fountain solution concentrate that uses quaternary amine salts of organic acids known to be helpful in fountain solution design along with a water soluble organic solvent which includes isopropyl alcohol. These ingredients can be admixed with various other organic solvents such as gamma-butyrolactone, isobutyl alcohol, ethylene glycol, glycerol, hexylene glycol, and various water miscible glycol ethers. Of these solvents only isobutyl alcohol is not water miscible and its concentration is restricted when combined with isopropyl in order to maintain water solubility.

Presently, the most common additive to fountain solutions is n-butoxy ethanol either alone or with other water miscible materials such as ethylene glycol and so forth. Many printers will maintain that such additives, though much better than no additive at all, do not perform as well as ethyl or isopropyl alcohol.

SUMMARY OF THE INVENTION

Ethyl and isopropyl alcohol not only cause a lowering of surface tension when added to a fountain solution but also cause an aggressive spreading of the solution over a printing plate. It is my belief that this aggressive spreading is caused by a variation of surface tension across the area of the fountain solution film. I have observed that the type of spreading which characterizes isopropyl or ethyl alcohol additions is correlated with advantageous behavior as a fountain solution additive and that such behavior can be obtained with other than ethyl or isopropyl alcohols.

Alcohol evaporates more rapidly than water; and evaporation occurs most rapidly at the edge of a drop. This evaporation causes the alcohol content to be relatively depleted at the edge of a drop. It is may belief that the observed aggressive spreading of fountain solutions containing isopropyl or ethyl alcohol occurs because alcohol lowers surface tension, and because there is less alcohol at the edge of the drop, the surface tension is greater at the edge than in the center. This lack of balance of force I believe tends to cause the surface of the center of the drop to move toward the edge and thus spread over the plate. This effect promotes contact across the hydrophilic areas.

As will be discussed in more detail below, I have found additives that perform as well as, or better than isopropyl or ethyl alcohol. Specific additives have been found that are not expensive, work at unusually low levels of concentration, and that present a minimal environmental burden.

This invention provides additives for fountain solutions which in comparison to known additives use a combination of relatively high volatility and an ability to lower surface tension of the solution. As will be described below, preferred materials are certain higher alcohols which have been found to work as well as or better than the ethyl or propyl alcohols they replace with regard to quality of printing and ability to do long runs.

It is not obvious to use alcohols that contain four or more carbon atoms in fountain solutions rather than current alcohols that contain two or three carbon atoms. Such materials are absent from the patent literature and from present commercial practice; and, as shown in the examples given below, such materials give results that are surprisingly better than the best of current practice.

It is may belief that a major factor in the failure of the industry to have discovered the advantages of using alcohols with greater than three carbon atoms in their molecular structure as fountain solution additives is the lack of water miscibility of all such alcohols (tertiary butyl alcohol is an exception but this material is relatively expensive and is a solid at slightly below room temperature). A review of the patent literature indicates that all products proposed as alcohol substitutes are water miscible with the exception of Bassimer et al U.S. Pat. No. 4,854,969 and even Bassimer uses hydrotropes to gain a degree of water miscibility. It would thus seem that water miscibility has been considered to be an important attribute of an alcohol replacement so that higher alcohols have not been considered.

A second factor has to do with the nature of the higher alcohols. All such alcohols of interest for the purposes of this invention have strong, somewhat unpleasant odors and can readily be rejected on such a basis. It is only after one has a knowledge that they work at very low concentrations that such a factor becomes unimportant.

Finally lower alcohols are volatile compared to alcohol substitutes currently in use. Volatility implies a low flash point and high toxic potential, both of which are undesirable qualities. Unless one has knowledge that volatility is important for proper functioning of the material and that the material works at very low concentrations (which helps alleviate any potential problems with flammability or toxicity), one is unlikely to attempt the use of such materials.

In summary unless one has a prior knowledge of the affects of volatility of a surfactant on the behavior of a fountain solution additive and a knowledge that certain of these materials work at low levels, the choice of alcohols containing four or more carbon atoms would seem to be unlikely because of their apparent undesirable properties.

As the number of carbon atoms in an alcohol molecule increases from one, the affect of the alcohol on surface tension of a water solution, even at low concentrations, rises dramatically. The volatility of the alcohol declines as the number of carbon atoms increases, but more slowly. Alcohols with more than three carbon atoms, such as n-butanol, are highly effective for lowering surface tension. I have found that they cause aggressive drop spreading on a printing plate apparently because they are more volatile than water. These materials are an effective replacement for conventional isopropyl or ethyl alcohol in a lithographic fountain solution.

Specific examples of desirable additives for fountain solutions are normal butyl alcohol and its isomers, normal amyl alcohol and its isomers, normal hexyl alcohol and its isomers, and combinations thereof.

DETAILED DESCRIPTION OF THE INVENTION

To lower surface tension, a molecule of a fountain solution additive must have a hydrophilic part and a hydrophobic part. The hydrophobic part can consist of most non-polar substituted or non-substituted hydrocarbons, or mostly hydrocarbons, or a hydrophilic silicone. The hydrophilic part can consist of almost any strongly polar, water-loving moiety.

Common surfactants have both hydrophobic and hydrophilic portions in their molecules. The hydrophilic portion can be defined as that portion which hydrogen bonds to water. Generally, the hydrophobe is a carbon chain of twelve or more carbon atoms, and the hydrophile most commonly is a sulfonic or sulfate group or an ethoxy chain. To my knowledge no materials called surfactants are now in use which are as volatile as water.

To say that a material acts like a surfactant is to say that when the material is mixed in water it lowers the surface tension of the water. Such lowering is readily measured by means of devices designed for the purpose, for example, a Fisher Surface Tensiometer available from Fisher Scientific, Cincinnati, Ohio.

For purposes of testing the effectiveness of a potential additive for fountain solutions, a sample can be mixed with water or a fountain solution and the decline in surface tension measured. It will be seen from such measurements that the relative number of carbon atoms in the hydrophobic part of the molecule has a strong influence on the decline of surface tension seen at a particular concentration. For example, when about 20% methyl alcohol by weight is added to water the surface tension drops from about 72 to 50 dyne/cm. Only 10% of ethyl alcohol by weight is required to achieve the same result, whereas only about 1% by weight of n-butanol is required.

Because what is needed is an economical, effective replacement for ethyl or isopropyl alcohol, the surfactants used herein are partially water soluble entities that, when added to pure water in a concentration of less than about five percent by weight of the total, lower the water's surface tension to less than 50 dyne/cm. This limit excludes methyl, ethyl, isopropyl, and n-propyl alcohols from the scope of this invention; they do not sufficiently lower surface tension at such small concentrations.

The relative volatility of the additive can be precisely defined in terms of the relative concentration of the material in the vapor above the mix with water compared to the concentration in the liquid. However, as a more easily measured criterion, I have found that, for materials of interest, the boiling points are a fairly good indicator of the relative rate of evaporation in comparison to that of water. I have found that as long as the boiling point of the volatile surfactant is below about 170 degrees C. there is adequate volatility compared to water. Material boiling below about 150 degrees C. are preferred.

A fountain solution additive should, first of all, be effective in producing good printing. In addition it should be economical, non-toxic, have little odor, and should be effective at low concentrations. For the hydrophobic part of a molecule of the additive, a hydrocarbon, especially an aliphatic hydrocarbon, appears to give the best combination of effectiveness and cost and thus is most preferred.

For the hydrophilic part of the additive molecule, the hydroxyl, carboxyl, mercapto, nitro, nitrile, amino, ester, and carbonyl groups are theoretical possibilities. All these moieties have been considered for use herein and all have some utility. All have the capability of hydrogen bonding to water.

However, because the carboxyl and amino groups ionize over a significant range of pH and thus become non-volatile, they are not preferred. The mercapto group and carboxyl group tend to give very odorous materials with lower aliphatic hydrocarbons and are thus not preferred. The nitro and nitrile groups tend to be suspect from the standpoint of health and safety and thus are not preferred, though they are usable.

The ester group was found to be effective in such volatile organics as n-butyl acetate and n-propyl acetate. With these materials the odors are pleasant, but the lowering of surface tension at the solubility limit was somewhat disappointing and as a result drop spreading was not promoted as much as with other materials. Ketones and aldehydes tend to suffer from the same defect.

There is a series of materials derived from the ethoxylation of alcohols such as 2-(n-butyoxy)ethanol. Such materials are in current use as fountain solution additives and have been discussed above in connection with prior art. Those materials with only one ethoxylation tend to be too soluble and thus lower surface tension too slowly until the material derived from n-butanol is reached, but this material has a boiling point of 171 degrees C. and is excluded from the scope of this invention; it is not as effective as other more volatile materials described in the examples.

I have found that alcohols with between four and about eight carbon atoms are preferred and those alcohols that are normal and have four to six atoms are more preferred. In particular n-butanol or n-butanol mixed with a portion of n-amyl alcohol are more preferred combinations. A concentration of less than 5% by weight of the total fountain solution is usually effective; a concentration of less than 3% by weight is preferred. When n-butanol is added to a fountain solution at the rate of three to six oz./gal (corresponding to a concentration of about 1.9 to 3.8% by weight of the total solution) the combination gives results at least as good as isopropanol added at the amount of fifteen to thirty oz/gal.

One material stands out as most preferred and is methyl isobutyl carbinol (4-methyl pentanol-2). This material has a closed cup flash point of about 106 degrees F. so as to be considered combustible (rather than flammable) by the U.S. Department of Transportation. The material is readily available commercially, is not expensive, has relatively low odor, and works well at a concentration of 1.5 oz./gal. (which corresponds closely to one percent of the total solution by weight). For all these reasons methyl isobutyl carbinol stands out as most preferred.

The operation of the principles of this invention may be further explained through the following examples.

EXAMPLE 1

A fresh clean printing plate was used for test of a solution of four parts by weight of n-butanol dissolved in 96 parts by weight of distilled water (4 wt. % of the total solution). A solution of twenty parts of isopropyl alcohol dissolved in 80 parts water was used as one control and pure water was used as a second. A third control was a solution of 0.05% of Tergitol 24-L-50 available from Chemcentral of Cincinnati, Ohio. An eye dropper was used to drop one drop each of water, n-butanol solution, Tergitol solution, and isopropyl alcohol solution on the plate and the spread of the drops measured. The water formed a spot about three eights inch in diameter and stabilized. The Tergitol solution spread to a uniform circular spot a little larger than one inch in diameter. The isopropyl solution spread rapidly into a spot about one and one half inch in diameter. The n-butanol solution spread rapidly into a spot that is at least as large as that from the isopropyl alcohol. As discussed above the spreading of a drop on a printing plate as described in this example seems to correlate with advantageous behavior as a fountain solution additive. Thus I suggest this very simple spreading test as a means of surveying materials for advantageous potential as fountain solution additives.

EXAMPLE 2

A solution of two parts by weight of n-butanol and one part by weight of n-pentanol was prepared and used at two parts of the alcohol mix to 98 parts water by weight (2 wt. % of the total). When dropped with an eye dropper onto a printing plate as per the procedure described in example one, the solution spread to about one and one half inch in diameter much like the solution of isopropyl alcohol.

EXAMPLE 3

A sample of n-butanol was submitted to Printing Service Company of Dayton, Ohio as a replacement for isopropyl alcohol and the pressman instructed to use the material at 3 oz/gal (about 1.9 wt. % of the total solution) as a replacement for the isopropyl alcohol that they would normally add at 20 oz./gal. to the fountain solution they would normally use. The n-butanol was run for a week on various colors and always in comparison to isopropyl on the same press but at different print stations. After a week's time it was the opinion of the pressman that the new material ran as well or better than the isopropyl alcohol.

EXAMPLE 4

The pressmen at a large web offset printing plant were instructed to run n-butanol as an additive at three ounces per gallon as a replacement for the 2-butoxy ethanol which they normally use in their fountain solution at 3.5 oz./gal.. This material was run for two days at 2.8 oz./gal. and it was judged to be superior to the 2-butoxy ethanol. In this test it was observed that fountain solution consumption declined, there was greater latitude in the press settings regarding water-ink balance and quality of printing was both more consistent and better overall.

EXAMPLE 5

The pressmen at the same printing plant discussed in example 4 were instructed to run methyl isobutyl carbinol (2-methyl-4-pentanol) at one and one half ounces per gallon as a replacement for the 2-butoxy ethanol that they would normally use at 3.5 oz./gal.. It was found that compared to the 2-butoxy ethanol the water demand of the press was reduced about 30% (i.e. to about 70% of normal), print quality improved, and the latitude in the press settings regarding water-ink balance improved.

What is claimed is:

1. An improved fountain solution for wetting a lithographic printing plate, said solution containing an amount, between about 1.9 and 5 wt. % of a surfactant composition having a boiling point at one atmosphere pressure of less than 170 degrees C., the amount of said surfactant composition being effective to lower the surface tension of water to less than 50 dyne/cm and to cause said solution to spread aggressively on a lithographic printing plate when contacted therewith.

2. An improved fountain solution according to claim 1 wherein the said surfactant composition has a boiling point of less than 150 degrees C. at one atmosphere pressure.

3. An improved fountain solution according to claim 1 wherein the said fountain solution contains less than 3% by weight of the said surfactant composition.

4. An improved fountain solution according to claim 1 which contains less than 3% by weight of the said surfactant composition and wherein the said surfactant composition has a boiling point at one atmosphere pressure no higher than 150 degrees C.

5. An improved fountain solution according to claim 1 wherein the said surfactant composition is an isomer of butyl alcohol, an isomer of amyl alcohol, an isomer of hexyl alcohol or a mixture thereof.

6. An improved fountain solution concentrate containing a surfactant composition having a boiling point of less than 170 degrees C. at one atmosphere pressure and having the capability of lowering the surface tension of water to less than 50 dyne/cm at a concentration in the water of at least about 1.9% but less than 5% by weight, said surfactant composition further having the capability of causing said solution to spread aggressively on a lithographic printing plate when contacted therewith.

7. An improved fountain solution concentrate according to claim 6 in which the said surfactant composition has a boiling point of less than 150 degrees C.

8. An improved fountain solution concentrate according to claim 6 wherein the said surfactant composition has the capability of lowering the surface tension of water to less than 50 dyne/cm at a concentration of less than 3% by weight.

9. An improved fountain solution concentrate according to claim 6 wherein the said surfactant composition has a boiling point of less than 150 degrees centigrade at one atmosphere pressure and wherein the said surfactant composition has the capability of lowering the surface tension of water to less than 50 dyne/cm at a concentration in the range of about 1.9-3% by weight.

10. An improved fountain solution concentrate according to claim 6 wherein said surfactant composition comprises an isomer of butyl alcohol, an isomer of amyl alcohol, an isomer of hexyl alcohol, or a mixture thereof.

11. The method of making an improved fountain solution for lithographic printing, comprising, adding to a fountain solution an amount of at least about 1.9% but less than 5% by weight of a surfactant composition having a boiling point below 170 degrees C. at a pressure of one atmosphere, and which is effective to reduce the surface tension of said improved fountain solution to less than 50 dyne/cm, the amount of said surfactant composition added further being effective to cause said solution to spread aggressively on a lithographic printing plate when contacted therewith.

12. The method of claim 11 wherein the surfactant composition has a boiling point of below 150 degrees C. at a pressure of one atmosphere.

13. The method of claim 11 wherein the said surfactant composition is added at a level of less than 3% by weight.

14. The method of claim 11 wherein the said surfactant composition is added at a level of less than 3% by weight and wherein the said surfactant composition has a boiling point of less than 150 degrees C. at a pressure of one atmosphere.

15. The method of claim 11 wherein the said surfactant composition is an isomer of butyl alcohol, an isomer of amyl alcohol, an isomer of hexyl alcohol or a mixture thereof.

* * * * *